(12) United States Patent
Liu et al.

(10) Patent No.: US 6,883,869 B2
(45) Date of Patent: Apr. 26, 2005

(54) VEHICLE SEAT BACK RECLINER

(75) Inventors: Hsing Lung Lewis Liu, Novi, MI (US); Karl A. Murphy, Novi, MI (US); Brent C. Everett, Roseville, MI (US); Yue Lang, Northville, MI (US)

(73) Assignee: Porter Group, LLC, Novi, MI (US)

( * ) Notice: Subject to any disclaimer, the term of this patent is extended or adjusted under 35 U.S.C. 154(b) by 0 days.

(21) Appl. No.: 10/385,336

(22) Filed: Mar. 10, 2003

(65) Prior Publication Data

US 2004/0195890 A1 Oct. 7, 2004

(51) Int. Cl.⁷ .................................................. B60N 2/20
(52) U.S. Cl. ..................................... 297/367; 297/366
(58) Field of Search ................................. 297/366, 367

(56) References Cited

U.S. PATENT DOCUMENTS

| | | | |
|---|---|---|---|
| 4,770,464 A | | 9/1988 | Pipon et al. |
| 4,997,223 A | * | 3/1991 | Croft .......................... 297/367 |
| 5,216,936 A | | 6/1993 | Baloche |
| 6,003,945 A | * | 12/1999 | Kojima ........................ 297/367 |
| 6,039,400 A | * | 3/2000 | Yoshida et al. ............. 297/367 |
| 6,102,480 A | | 8/2000 | Asano |
| 6,260,923 B1 | | 7/2001 | Yamada et al. |
| 6,328,382 B1 | | 12/2001 | Yamashita |
| 6,332,649 B1 | * | 12/2001 | Vossmann .................... 297/366 |
| 6,454,354 B1 | | 9/2002 | Vossmann et al. |

FOREIGN PATENT DOCUMENTS

| | | | | |
|---|---|---|---|---|
| GB | 2117440 A | * | 10/1983 | ........... E05D/11/10 |
| JP | 1-104201 | | 4/1989 | |

* cited by examiner

Primary Examiner—Peter M. Cuomo
Assistant Examiner—Stephen D'Adamo
(74) Attorney, Agent, or Firm—Brooks Kushman P.C.

(57) ABSTRACT

A vehicle seat back recliner (18) includes a locking mechanism (28) having a pair of toothed pawls (34) and a pair of cams (38) operated by a control (40) to provide locking and release between a stationary seat cushion mounted member (20) and a pivotal seat back member (24). A spring (68) of the control (40) biases the locking mechanism to a locked condition and upon release springs (50) move the toothed pawls (34) out of engagement with the toothed locking ring (32) to permit pivotal adjustment of the seat back member (24). In one embodiment, the cams (38) move in rectilinear directions and have flat actuating surfaces engaged with flat actuating surfaces of the pawls, while another embodiment has the cams (38') moved in curved paths and having curved actuating surfaces slidably engaged with curved actuating surfaces of the pawls.

15 Claims, 5 Drawing Sheets

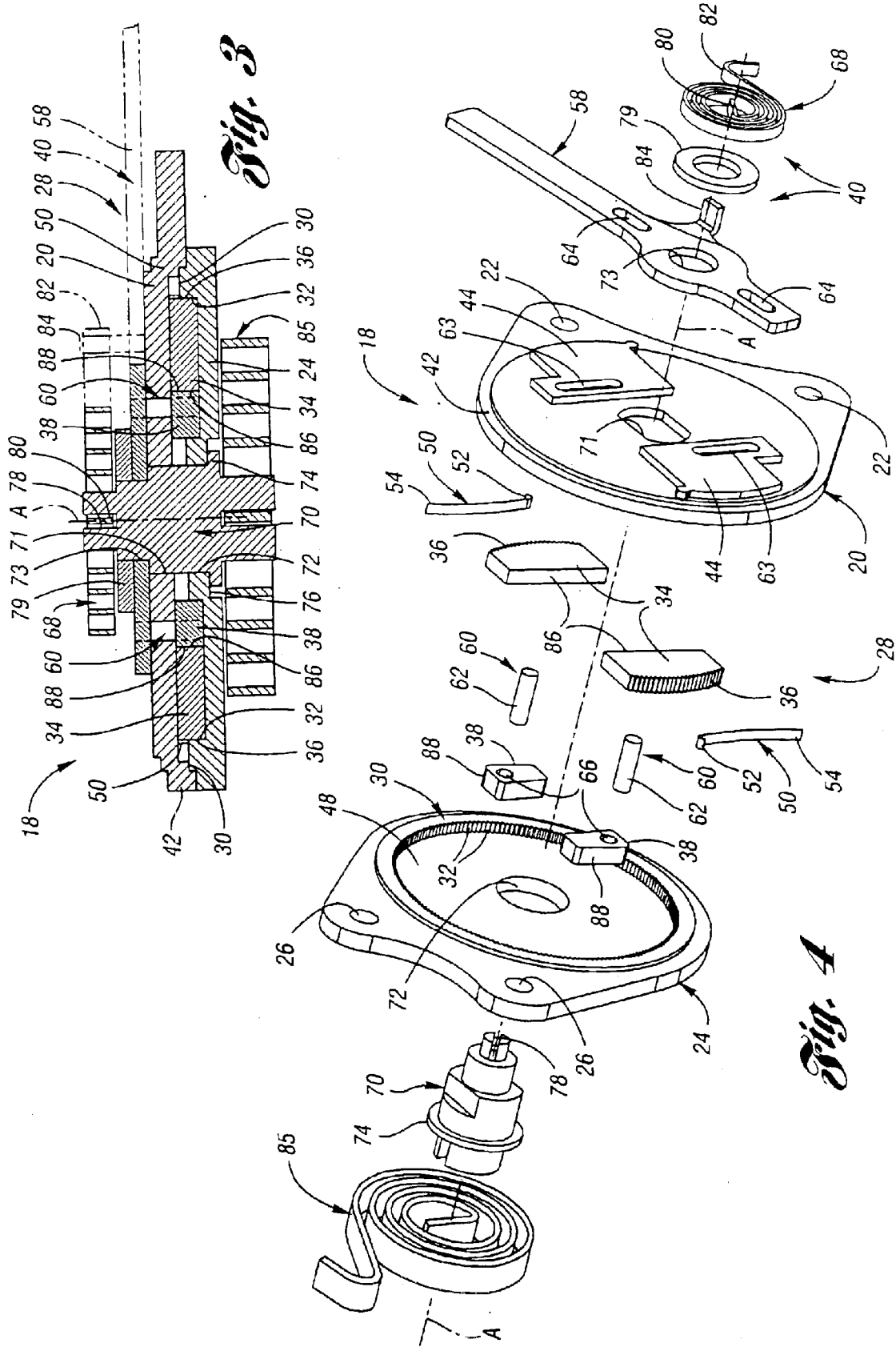

VEHICLE SEAT BACK RECLINER

BACKGROUND OF THE INVENTION

1. Field of the Invention

This inventions relates to a vehicle seat back recliner for permitting tilting adjustment of a seat back with respect to an associated seat cushion of a vehicle seat.

2. Background Art

Vehicle seat back recliners of the "rotary" type conventionally include a stationary member mounted on the associated seat cushion and a pivotal member that is mounted for pivotal movement about a pivotal axis on the stationary member to mount a seat back. A locking mechanism controls the adjusted position of the pivotal member on the stationary member to control the tilted orientation of the seat back. Such recliners can position the seat back generally upright for normal seating, rearwardly for reclined seating, forwardly for access to the rear of the seat or horizontally in a forward direction for cargo usage.

Conventional locking mechanisms of the rotary type of seat back recliners include a toothed locking ring on the pivotal member and a plurality of pawls mounted on the stationary member for movement between locking and unlocked positions with respect to the toothed ring under the control of a single cam that rotates around the pivotal axis of the recliner and has cam lobes engaging each of the pawls. With such a construction, full locking engagement of one of the toothed pawls with the toothed locking ring can prevent farther cam movement and complete locking of each other pawl.

Prior vehicle seat back recliners noted during an investigation conducted in connection with the present application include: U.S. Pat. No. 4,770,464 Pipon et al.; U.S. Pat. No. 5,216,936 Baloche; U.S. Pat. No. 6,102,480 Asano; U.S. Pat. No. 6,260,923 Yamada et al.; U.S. Pat. No. 6,328,382 Yamashita; and U.S. Pat. No. 6,454,354 Vossmann et al.; and also include Japanese Patent Publication 1-104201.

SUMMARY OF THE INVENTION

An object of the present invention is to provide an improved vehicle seat back recliner.

In carrying out the above object, the vehicle seat back recliner of the invention includes a stationary member for mounting on a vehicle seat cushion of a vehicle seat with which the recliner is to be used. The recliner also includes a pivotal member that is mounted for pivotal movement about a pivotal axis on the stationary member and that is adapted to mount a seat back of the vehicle seat. A locking mechanism of the recliner selectively permits pivotal adjustment and locking of the pivotal position of the pivotal member on the stationary member to pivotally position the seat back with respect to the seat cushion. The locking mechanism includes a toothed locking ring on the pivotal member. A pair of toothed pawls are mounted on the stationary member for radial movement with respect to the pivotal axis at diametrically opposite locations between locking positions where the pawls are engaged with the toothed locking ring to permit pivotal movement of the seat back with respect to the seat cushion and unlocked positions where the pawls are unlocked from the locking ring to permit pivotal movement of the seat back with respect to the seat cushion. A pair of separate cams are respectively associated with the pair of pawls and movable with respect with each other and with respect to the pawls on opposite sides of the pivotal axis to respectively slidingly engage the pair of pawls. A control biases the pair of cams to move the pair of pawls to the locking positions and is releasable so the cams permit movement of the pawls to the unlocked positions.

The construction of the locking mechanism with the toothed pawls moved by the pair of separate cams under the operation of the control ensures that both pawls are fully locked. More specifically, after one cam has moved one of the pawls to the fully locked position with respect to the toothed locking ring, normal tolerance variations due to the separate construction of the pair of cams permit the other cam to continue moving to fully lock its associated pawl.

The recliner includes a pair of springs that respectively bias the pair of pawls radially toward the pivotal axis such that when the control is released to permit the unlocking of the pawls, the pawls move out of engagement with the toothed locking ring. The pair of springs are leaf springs that are mounted by the stationary member and respectively engage the teeth of the pair of toothed pawls to move the pawls out of engagement with the toothed locking ring when permitted to do so by the control. More specifically, the pair of leaf springs each has one end mounted by the stationary member and a distal end that can move with respect to the associated pawl.

The control of the recliner includes a control lever that pivots about the pivotal axis and has a pair of connections to the pair of cams. A spring pivotally biases the control lever to bias the pair of cams to move the pawls toward the locking positions. The control lever is movable against the spring bias thereof to move the pair of cams to permit movement of the pair of pawls to the unlocked positions. A central pivotal connector pivotally connects the stationary member and the pivotal member as well as the control lever about the pivotal axis. The spring that biases the control lever is embodied by a spiral spring that extends around the central pivotal connector. The pair of connections includes a pair of pins that extend between the pair of cams and the control lever through a pair of slots in the stationary member on opposite sides of the pivotal axis.

In one embodiment of the recliner, the pair of pawls each has a flat actuating surface that extends in an inclined relationship with a diameter extending between the pair of pawls through the pivotal axis. Each of the pair of cams in this embodiment has a flat actuating surface that extends in an inclined relationship to the diameter extending between the pair of pawls and in sliding engagement with the flat actuating surface of the associated pawl. The control has its control lever pivoting about the pivotal axis and has the pair of connections to the pair of cams to move the cams in rectilinear directions perpendicular to the diameter extending between the pair of pawls. The spring biases the pivotal control lever to bias the pair of cams to move the pair of pawls toward the locking positions as the flat actuating surfaces of the pawls and cams slidingly engage each other. The control lever is movable against the spring bias thereof to move the pair of cams to permit the movement of the pair of pawls to the unlocked positions. Furthermore, the pair of springs embodied by the previously mentioned leaf springs respectively bias the pair of pawls radially toward the pivotal axis to move the pawls out of engagement with the toothed locking ring in the unlocked positions when permitted to do so by the control lever.

In another embodiment, the pair of pawls each has a curved actuating surface and each of the pair of cams has a curved actuating surface that slidably engages the curved actuating surface of the associated pawl. The control lever of the control pivots about the pivotal axis and has a pair of connections to the pair of cams to move the cams in curved paths. The spring that biases the control lever thus biases the pair of cams to move the pair of pawls toward locking positions as the curved actuating surfaces of the pawls and cams slidingly engage each other. The control lever is movable against the spring bias thereof to move the pair of cams to permit the movement of the pair of toothed pawls to the unlocked positions. Furthermore, the pair of springs embodied by the previously mentioned leaf springs respectively bias the pair of pawls radially toward the pivotal axis to move the pawls out of engagement with the toothed locking ring in the unlocked position when permitted to do so by the control lever.

The objects, features and advantages of the present invention are readily apparent from the following detailed description of the preferred embodiments when taken in connection with the accompanying drawings.

BRIEF DESCRIPTION OF THE DRAWINGS

FIG. 3 is a sectional view through the recliner taken along the direction of line 3—3 in FIG. 1.

FIG. 4 is an exploded perspective view of the recliner illustrating a stationary member, a pivotal member having a toothed locking ring, a pair of toothed pawls, a pair of cams respectively associated with the pair of pawls, and a control that locks and selectively permits unlocking of the recliner.

DETAILED DESCRIPTION OF THE PREFERRED EMBODIMENTS

Figure 1:
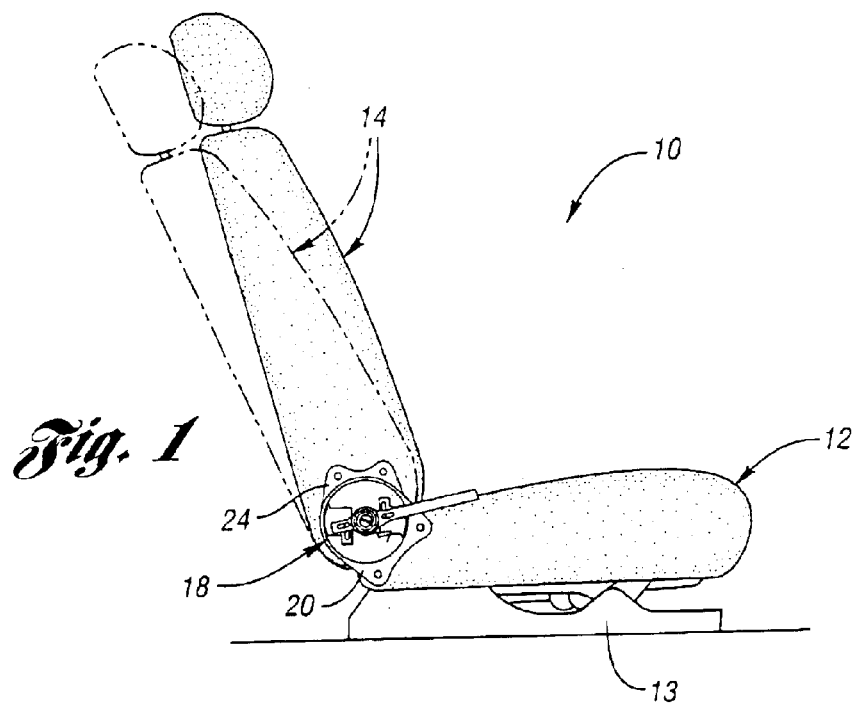
FIG. 1 is a side elevational view of a vehicle seat including a recliner for providing tilting adjustment and positioning of a seat back with respect to a seat cushion of the seat.

With reference to FIG. 1, a vehicle seat generally indicated by 10 includes a seat cushion 12 that is mounted on the vehicle floor either fixedly or by a longitudinally adjustable seat adjuster 13. A seat back 14 of the seat is mounted and pivotally positioned with respect to the seat cushion 12 by a recliner 18 constructed in accordance with the present invention. The recliner 18 can be utilized to adjust the tilted position of the seat back 14 as shown by solid and phantom line positions and can be also utilized to permit farther reclining rearwardly, forward tilting of the seat back to permit access to and from the rear of the seat such as is conventional with two door vehicle seats to facilitate the access room to the rear seat, or forward tilting to a horizontal position for cargo usage.

Figure 2:
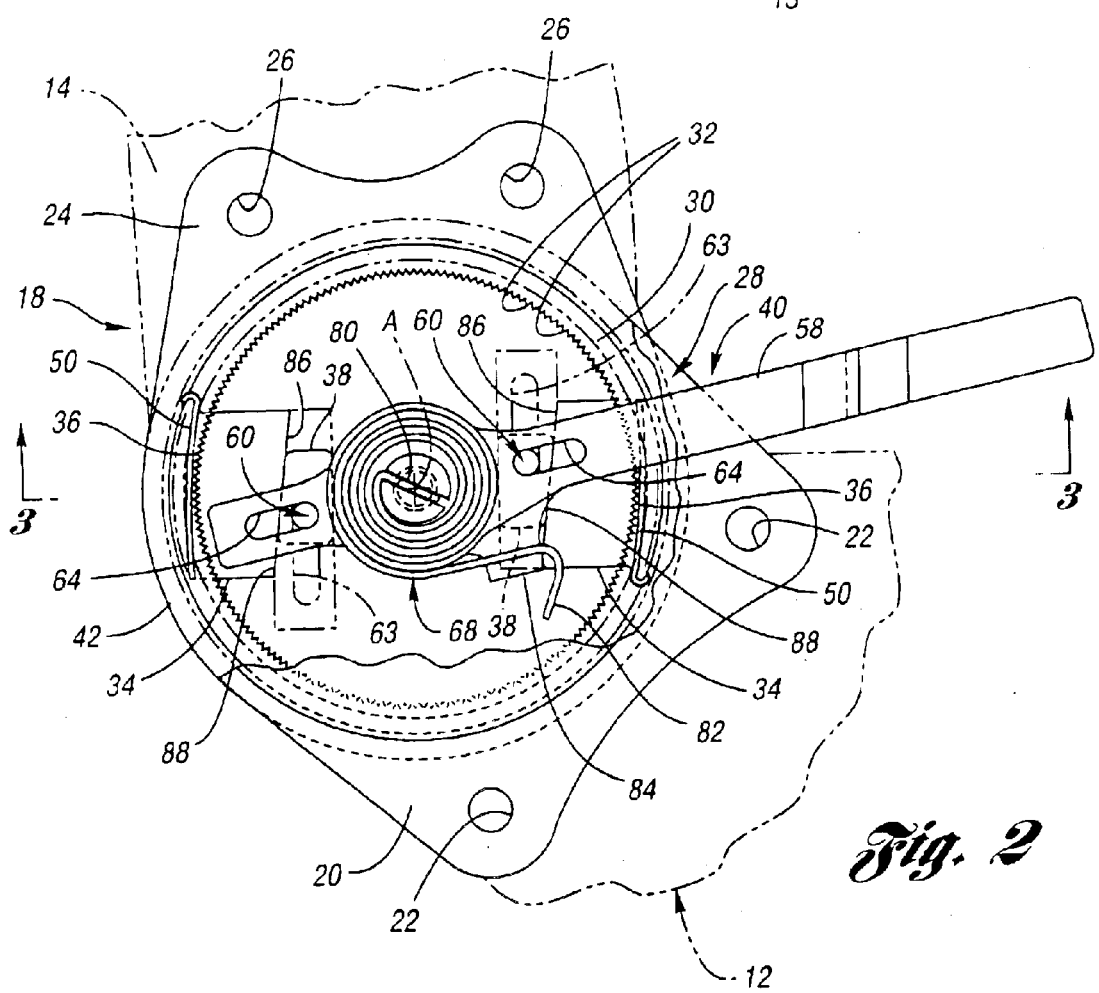
FIG. 2 is an enlarged partially broken away view of the recliner illustrated in FIG. 1.
Figure 5:
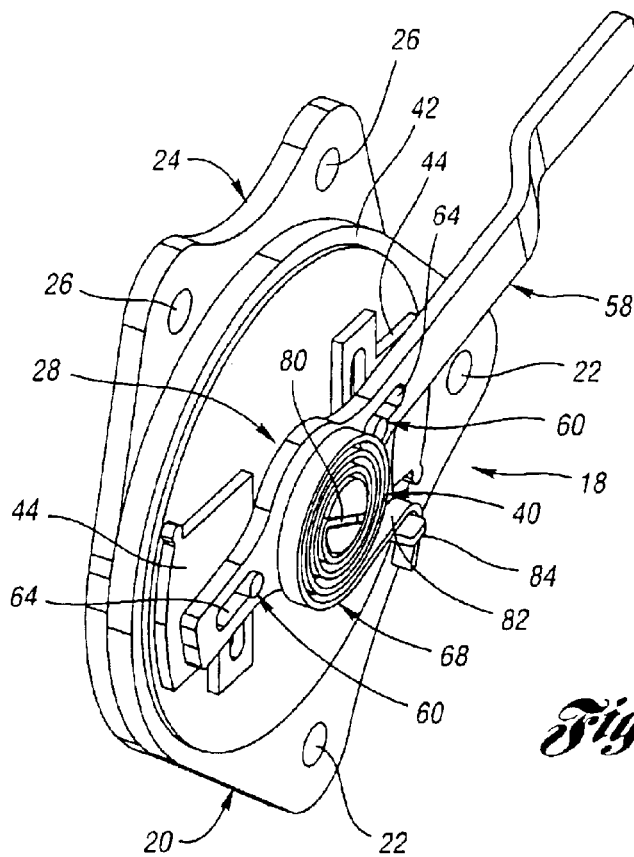
FIG. 5 is a perspective view of the recliner in its assembled condition.

With reference to FIG. 2, the recliner 18 of the invention includes a stationary member 20 for mounting on the vehicle seat cushion 12, specifically to an unshown frame thereof by unshown connectors extending through connector holes 22. A pivotal member 24 of the recliner is mounted for pivotal movement about a pivotal axis A on the stationary member 20 and is adapted to mount the seat back 14 at its unshown frame by unshown connectors extending through connector holes 26. A lock mechanism collectively indicated by 28 selectively permits pivotal adjustment and locking of the pivotal position of the pivotal member 24 on the stationary member 20 to pivotally position the seat back 14 with respect to the seat cushion.

With continued reference to FIG. 2 and additional reference to FIGS. 3 and 4, the pivotal member 24 includes a toothed locking ring 30 that is best illustrated in FIG. 4 as having teeth 32 extending about the pivotal axis A. As illustrated, the teeth 32 of the locking ring as shown extend the full 360 degrees about the pivotal axis A which is desirable for permitting versatility of recliner manufacturing from tooling so that one tool can produce recliners that position the seat back at various tilted positions. However, in its broadest aspects, the toothed locking ring could also be constructed with partial segments that only have teeth at partial angular extents about the pivotal axis A.

Figure 6:
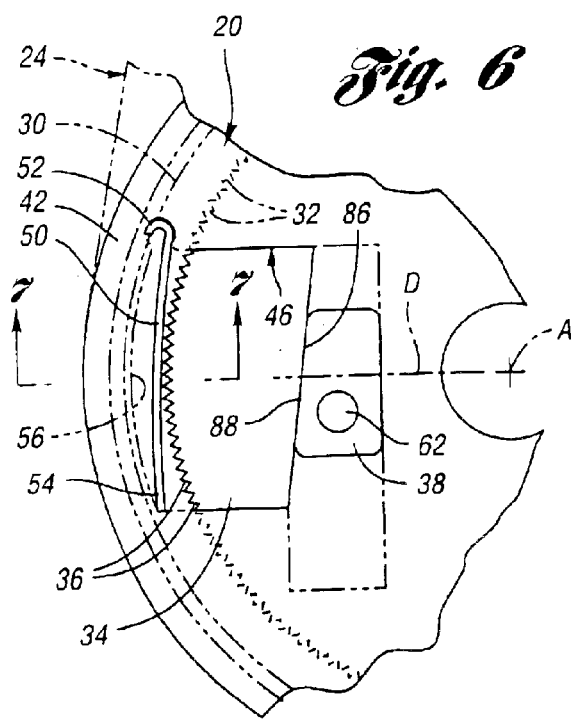
FIG. 6 is a partial view that illustrates the manner in which the toothed pawls are positioned in locking positions with respect to the toothed locking ring by the cams.
Figure 8:
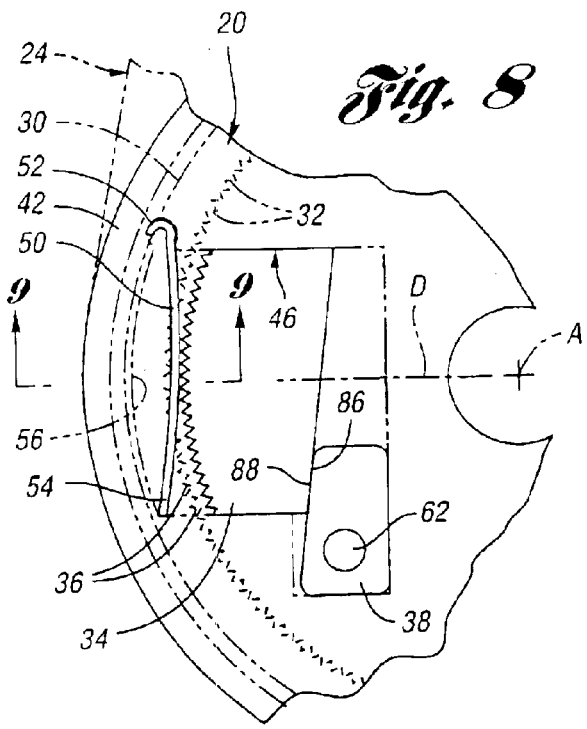
FIG. 8 is a partial view similar to FIG. 6 but showing the unlocked position of the toothed pawls under the control of the cams.

As best shown in FIG. 4 and also illustrated in FIGS. 2 and 3, the locking mechanism 28 also includes a pair of toothed pawls 34 that are mounted on the stationary member 20 for radial movement with respect to the pivotal axis at diametrically opposite locations. The pawls 34 have teeth 36 for locking with the teeth 32 of the toothed locking ring 30 as shown in FIG. 6 to prevent pivotal movement of the seat back with respect to the seat cushion. The toothed pawls 34 also have unlocked positions as shown in FIG. 8 where the teeth 36 thereof are unlocked from the teeth 32 of the toothed locking ring 30 to permit pivotal movement of the seat back with respect to the seat cushion. A pair of separate cams 38 are respectively associated with the pair of pawls 34 and are movable with respect to each other and with respect to the pawls 36 on opposite sides of the pivotal axis A to respectively slidingly engage the pawls as shown in FIG. 2. A control collectively indicated by 40 biases the pair of cams 38 to move the pawls to the locking position illustrated by FIG. 6, and the control is releasable by manual actuation so the cams 38 permit movement of the pawls 34 to the unlocked positions illustrated by FIG. 8 in order to permit the seat back pivoting.

Figure 7:
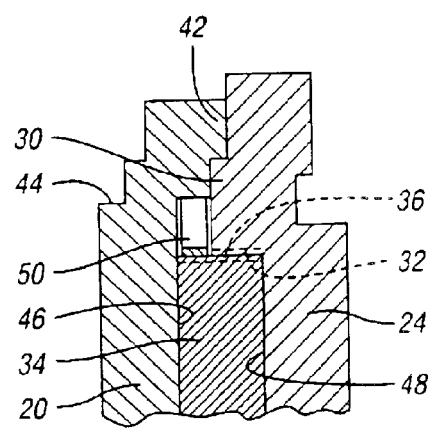
FIG. 7 is a sectional view taken along the direction of line 7—7 in FIG. 6 to further illustrate the locked condition of the toothed pawls with respect to the toothed locking ring.
Figure 9:
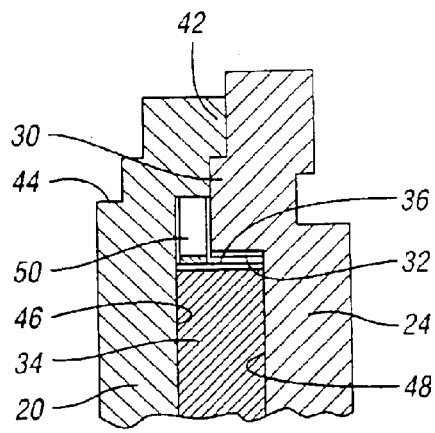
FIG. 9 is a sectional view taken along the direction of line 9—9 in FIG. 8 to further illustrate the unlocked condition of the recliner.

As shown in FIGS. 4, 7 and 9, the stationary member 20 is stamped to form an outer annular ring 42, and the pivotal member 24 is also stamped to form its toothed locking ring 30 which is received within the outer annular ring 42 of the stationary member to provide pivotal support between the members. Furthermore, the stationary member 20 is also stamped as shown in FIG. 4 with a pair of formations 44 on diametrically opposite sides of the pivotal axis A and define pockets 46 (FIGS. 6–9) that each receives one of the toothed pawls 34 and its associated cam 38 as shown in FIGS. 6 and 8. The toothed locking ring 30 as shown in FIG. 4 also defines a recess 48 that partially receives each of the toothed pawls 34 and its associated cam as shown in FIGS. 7 and 9.

Thus, upon insertion of the toothed locking ring 30 on the pivotal member 24 into the outer annular ring 42 of the stationary member 20, the toothed pawls 34 and associated cams 38 are received within the stationary member pockets 46 shown in FIGS. 6 and 8 and in the pivotal member recess 48 to provide assembly of the recliner.

As shown in FIG. 4 the recliner also includes a pair of springs 50 that respectively bias the pair of pawls 34 radially toward the pivotal axis A. More specifically as illustrated in FIGS. 6 and 8, the pair of springs 50 are leaf springs that are mounted on the stationary member 20 with each in one of the pockets 46. The leaf springs 50 each engage the teeth 36 of the associated pawl 34 to move the pawls out of engagement with the toothed locking ring 30 of the pivotal member 24 when permitted to do so by the control 40 as it is manually released. More specifically, movement of the control 40 moves each of the cams 38 from the position illustrated in FIG. 6 to the position illustrated in FIG. 8 so the associated spring 50 can move the pawl 34 out of engagement with the teeth 32 of the toothed locking ring 30. During pivotal adjustment of the seat back as the pivotal member 24 pivots on the stationary member 20, the disengagement of the pawl teeth 36 from the locking ring teeth 32 prevents any chatter or ratcheting of the teeth.

As best shown in FIGS. 6 and 7, the springs are received within the radial outer extremities of the pockets 46 and each has one hooked end 52 that is received within a radial outer corner of the associated pocket. Another distal end 54 of each spring 50 can slide with respect to the associated pawl 34 while engaged with the outer curved surface 56 of the pocket. Between these spring ends 52 and 54, the spring 50 engages the pawl teeth 36 to provide the radial inward bias of the pawl against the associated cam 38 whose movement controls the pawl position as previously discussed.

The control 40 illustrated in FIG. 4 includes a control lever 58 that pivots about the pivotal axis A and has a pair of connections 60 to the cams 38. More specifically, each connection 60 includes a pin 62 that extends through an associated rectilinear slot 63 in the stationary member 20 at the associated formation 44. Each pin 62 has one end received within a slot 64 in the control lever 58 and another end received within a hole 66 in the associated cam 38. Manually actuated pivoting of the control lever 58 thus moves the cams 38 between the positions of FIGS. 6 and 8 to provide the locking and unlocking as the pins slide radially within the slots 64.

The control 40 illustrated in FIG. 4 also includes a spring 68 that biases the control lever 58 to bias the pair of cams 38 to move the pair of pawls 34 toward the locking positions previously described. The control lever 58 is movable against its spring bias to move the cams to permit movement of the pair of pawls 34 to the unlocked positions with the springs 50 previously described in connection with FIGS. 6 and 8 providing the disengagement of the pawl teeth from the toothed locking ring.

A central pivotal connector 70 of the recliner is shown in FIGS. 3 and 4 and provides connection of the stationary member 20 and the pivotal member 24 as well as the control lever 58 about the pivotal axis A. More specifically, the connector 70 extends through a double flatted hole 71 in the stationary member 20 and has flats so as to be pivotally fixed to the stationary member. The connector 70 also extends through a round hole 72 in the pivotal member 24 which can thus pivot with respect to the connector. The connector 70 also extends through a round hole 73 in the control lever 58 between the pair of slots 64. Control lever 58 thus can rotate on the connector 70.

The connector 70 has a head 74 that, as shown in FIG. 3, is received within a central recess 76 in the pivotal member 24 and has a distal end including a slot 78. An annular fastener 79 is received by the connector 70 toward its head 74 from the slot 28 and deformation of the connector secures the fastener to maintain the assembled condition of the members 20 and 24 as well as the other components of the recliner.

The control spring 68 is of the spiral type that extends around the connector 70 at its slotted distal end 78 and includes an inner end 80 that is received within the slot 78 as well as including an outer end 82 of a hook shape that extends around an attachment flange 84 on the control lever 58. Spring 68 thus biases the control lever 58 clockwise as shown in FIG. 2 so as to bias the cams 38 to provide locking of the toothed pawls 34 with the toothed locking ring 30 as previously described. Connector 70 may also have a slotted head that receives the inner end of another spiral spring 85 whose outer end is connected to the seat back to bias the seat back forward when the recliner is released. The seat occupant can then lean backward against the seat to position the seat as desired and then lock the recliner.

As illustrated in FIGS. 6 and 8, the pair of pawls 34 each has a flat actuating surface 86 that extends in an inclined relationship with a diameter D extending between the pawls through the pivotal axis A. Each of the pair of cams 38 has a tapered shape including a flat actuating surface 88 that extends in an inclined relationship to the diameter D extending between the pair of pawls. The cam flat actuating surface 88 slidably engages the flat actuating surface 86 of the associated pawl. Operation of the control lever 58 shown in FIG. 4 through the connections provided with the pins 62 moves the cams 38 in rectilinear directions perpendicular to the diameter D extending between the pair of pawls 34, and the bias of the control spring 68 illustrated in FIGS. 2 and 3 moves the pawls to the locking position illustrated in FIG. 6 in engagement with the toothed locking ring 30. Movement of the control lever 58 against the bias of its associated spring 68 moves the cams 38 from the position of FIG. 6 to the position of FIG. 8 so the springs 50 can move the pawls 34 as the actuating surfaces 86 and 88 slide with respect to each other and as the springs 50 maintain their engagement and move the pawls 34 out of engagement with the toothed locking ring. This construction of the recliner is most preferred because any force on the recliner members tending to unlock the pawls 34 acts centrally toward the pivotal axis A without tending to rotate the pawls within their associated pockets 46.

Figure 10:
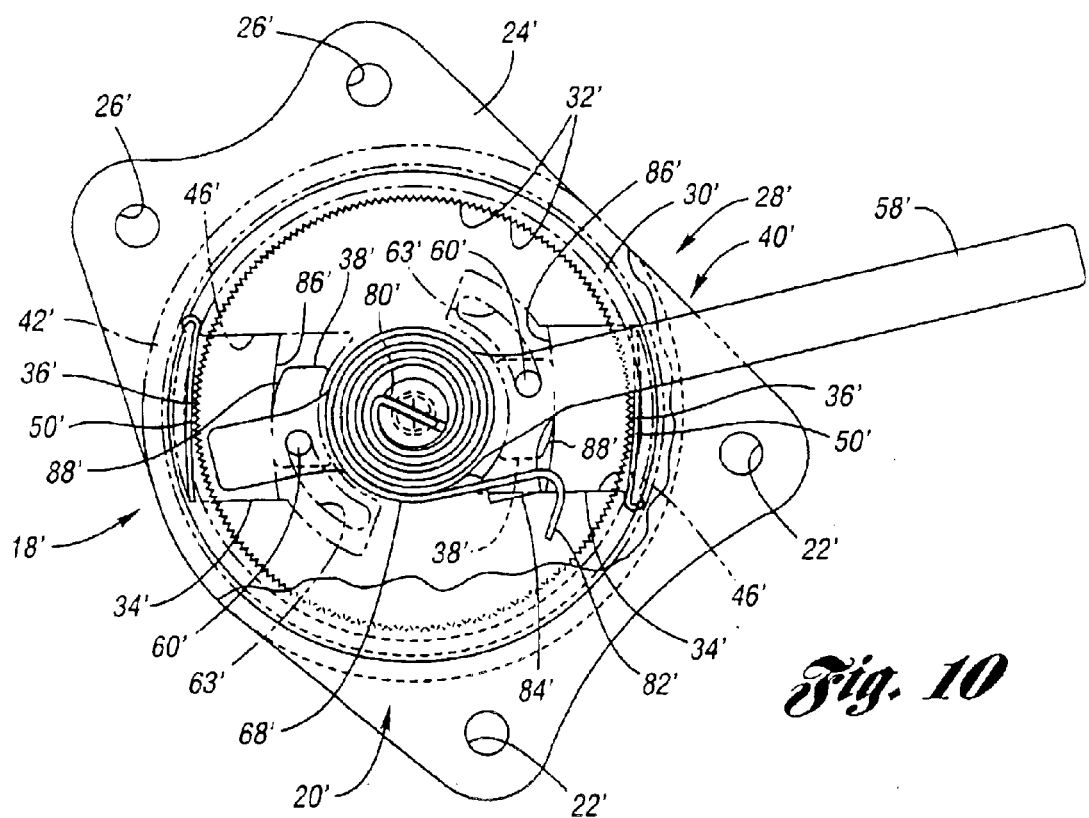
FIG. 10 is a view similar to FIG. 2 of another embodiment of the recliner wherein the cams move in curved paths as opposed to rectilinear paths as with the embodiment of FIGS. 1–9.
Figure 11:
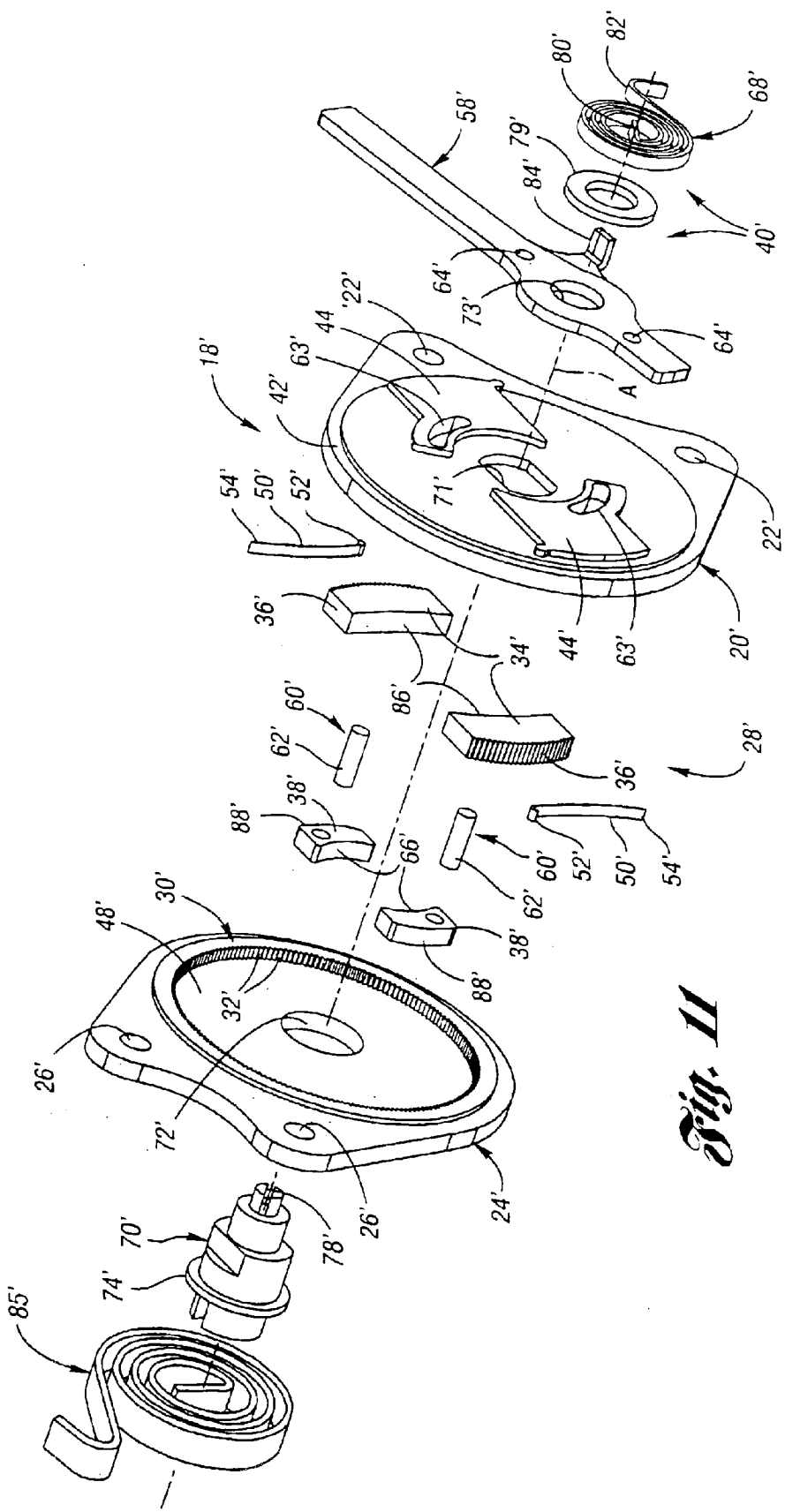
FIG. 11 is an exploded perspective view of the embodiment of FIG. 10.

With reference to FIGS. 10 and 11, another embodiment of the recliner 18' has generally the same construction as the previously described embodiment except as will be noted such that like components thereof are identified by like primed reference numerals and much of the previous description is applicable and will thus not be repeated.

In the embodiment of FIGS. 10 and 11, each of the pawls 34' has a curved actuating surface 86' and each of the cams 38' has a curved tapered shape including a curved actuating surface 88' that slidably engages the curved actuating surface 86' of the associated pawl 34'. The control 40' of this embodiment has a lever 58' with holes 64' instead of slots as with the previous embodiment for receiving the connection pins 62'. Rotation of the control lever 58' thus moves the pins 62' to move the cams 38' in curved paths so as to move the toothed pawls 34' between their locking and unlocked positions with respect to the associated toothed ring 32' on the pivotal member 24. The stationary member slots 63' in this embodiment are curved with partially circular shapes through which the pins 62' extend as opposed to the straight shape of the slots 63 in the previously described embodiment.

While the preferred embodiments for practicing the invention have been described in detail, those familiar with the art to which this invention relates will recognize various alternative designs and embodiments for practicing the invention as defined by the following claims.

What is claimed is:

1. A vehicle seat back recliner comprising:
   a stationary member for mounting on a vehicle seat cushion of a vehicle seat with which the recliner is to be used;
   a pivotal member that is mounted for pivotal movement about a pivotal axis on the stationary member and that is adapted to mount a seat back of the vehicle seat;
   a locking mechanism for selectively permitting pivotal adjustment and locking of the pivotal position of the pivotal member on the stationary member to pivotally position the seat back with respect to the seat cushion, the locking mechanism including a toothed locking ring on the pivotal member, a pair of toothed pawls mounted on the stationary member for radial movement with respect to the pivotal axis at diametrically opposite locations between locking positions where the pawls are engaged with the toothed locking ring to prevent pivotal movement of the seat back with respect to the seat cushion and unlocked positions where the pawls are unlocked from the locking ring to permit pivotal movement of the seat back with respect to the seat cushion, a pair of separate cams respectively associated with the pair of pawls and moveable with respect to each other and with respect to the pawls on opposite sides of the pivotal axis to respectively slidingly engage the pair of pawls, and a control that biases the pair of cams to move the pair of pawls to the locking positions and that is releasable so the cams permit movement of the pawls to the unlocked positions; and
   the control including a control lever that pivots about the pivotal axis and has a pair of connections to the pair of cams, a spring that pivotally biases the control lever to bias the pair of cams to move the pair of pawls toward the locking positions, the control lever being movable against the spring bias thereof to move the pair of cams to permit the movement of the pair of pawls to the unlocked positions, and the pair of connections including a pair of pins that extend between the pair of cams and the control lever through a pair of slots in the stationary member on opposite sides of the pivotal axis.

2. A vehicle seat back recliner as in claim 1 further including a central pivotal connector that pivotally connects the stationary member and the pivotal member as well as the control lever about the pivotal axis, and the spring biasing the control lever being a spiral spring that extends around the central pivotal connector.

3. A vehicle seat back recliner as in claim 1 further including a pair of springs that respectively bias the pair of pawls radially toward the pivotal axis.

4. A vehicle seat back recliner as in claim 3 wherein the pair of springs are leaf springs that are mounted on the stationary member and respectively engage the teeth of the pair of toothed pawls to move the pawls out of engagement with the toothed locking ring when permitted to do so by the control.

5. A vehicle seat back recliner as in claim 4 wherein the pair of leaf springs each has one end mounted by the stationary member and a distal end that can move with respect to the associated toothed pawl.

6. A vehicle seat back recliner comprising:
   a stationary member for mounting on a vehicle seat cushion of a vehicle seat with which the recliner is to be used;
   a pivotal member that is mounted for pivotal movement about a pivotal axis on the stationary member and that is adapted to mount a seat back of the vehicle seat;
   a locking mechanism for selectively permitting pivotal adjustment and locking of the pivotal position of the pivotal member on the stationary member to pivotally position the seat back with respect to the seat cushion, the locking mechanism including a toothed locking ring on the pivotal member, a pair of toothed pawls mounted on the stationary member for radial movement with respect to the pivotal axis at diametrically opposite locations between locking positions where the pawls are engaged with the toothed locking ring to prevent pivotal movement of the seat back with respect to the seat cushion and unlocked positions where the pawls are unlocked from the locking ring to permit pivotal movement of the seat back with respect to the seat cushion, a pair of separate cams respectively associated with the pair of pawls and moveable with respect to each other and with respect to the pawls on opposite sides of the pivotal axis to respectively slidingly engage the pair of pawls, and a control that biases the pair of cams to move the pair of pawls to the locking positions and that is releasable so the cams permit movement of the pawls to the unlocked positions; and
   the pair of pawls each having a flat actuating surface that extends in an inclined relationship with a diameter extending between the pair pawls through the pivotal axis, each of the pair of cams having a flat actuating surface that extends in an inclined relationship to the diameter extending between the pair of pawls and in slidable engagement with the flat actuating surface of the associated pawl, the control including a control lever that pivots about the pivotal axis and has a pair of connections to the pair of cams to move the cams in rectilinear directions perpendicular to the diameter extending between the pair of pawls, a spring that pivotally biases the control lever to bias the pair of cams to move the pair of pawls toward the locking positions as the flat actuating surfaces of the pawls and cams slidingly engage each other, and the control lever being movable against the spring bias thereof to move the pair of cams to permit the movement of the pair of pawls to the unlocked positions.

7. A vehicle seat back recliner as in claim 6 further including a central pivotal connector that pivotally connects the stationary member and the pivotal member as well as the control lever about the pivotal axis, and the spring biasing the control lever being a spiral spring that extends around the central pivotal connector.

8. A vehicle seat back recliner as in claim 6 further including a pair of springs that respectively bias the pair of pawls radially toward the pivotal axis.

9. A vehicle seat back recliner as in claim 8 wherein the pair of springs are leaf springs that are mounted on the stationary member and respectively engage the teeth of the pair of toothed pawls to move the pawls out of engagement with the toothed locking ring when permitted to do so by the control.

10. A vehicle seat back recliner as in claim 9 wherein the pair of leaf springs each has one end mounted by the stationary member and a distal end that can move with respect to the associated toothed pawl.

11. A vehicle seat back recliner comprising:

a stationary member for mounting on a vehicle seat cushion of a vehicle seat with which the recliner is to be used;

a pivotal member that is mounted for pivotal movement about a pivotal axis on the stationary member and that is adapted to mount a seat back of the vehicle seat; and a locking mechanism for selectively permitting pivotal adjustment and locking of the pivotal position of the pivotal member on the stationary member to pivotally position the seat back with respect to the seat cushion, the locking mechanism including a toothed locking ring on the pivotal member, a pair of toothed pawls mounted on the stationary member for radial movement with respect to the pivotal axis at diametrically opposite locations between locking positions where the pawls are engaged with the toothed locking ring to prevent pivotal movement of the seat back with respect to the seat cushion and unlocked positions where the pawls are unlocked from the locking ring to permit pivotal movement of the seat back with respect to the seat cushion, a pair of separate cams respectively associated with the pair of pawls and moveable with respect to each other and with respect to the pawls on opposite sides of the pivotal axis to respectively slidingly engage the pair of pawls, and a control that biases the pair of cams to move the pair of pawls to the locking positions and that is releasable so the cams permit movement of the pawls to the unlocked positions; and a pair of springs that respectively bias the pair of pawls radially toward the pivotal axis, the pair of pawls each having a flat actuating surface that extends in an inclined relationship with a diameter extending between the pair of pawls through the pivotal axis, each of the pair of cams having a flat actuating surface that extends in an inclined relationship to the diameter extending between the pair of pawls and in respective slidable engagement with the flat actuating surface of the associated pawl, the control including a control lever that pivots about the pivotal axis and has a pair of connections to the pair of cams to move the cams in rectilinear directions perpendicular to the diameter extending between the pair of pawls, a spring that pivotally biases the control lever to bias the pair of cams to move the pair of pawls toward the locking positions as the flat actuating surfaces of the pawls and cams slidingly engage each other, and the control lever being movable against the spring bias thereof to move the pair of cams to permit the movement of the pair of pawls to the unlocked positions.

12. A vehicle seat back recliner comprising:

a stationary member for mounting on a vehicle seat cushion of a vehicle seat with which the recliner is to be used;

a pivotal member that is mounted for pivotal movement about a pivotal axis on the stationary member and that is adapted to mount a seat back of the vehicle seat; and a locking mechanism for selectively permitting pivotal adjustment and locking of the pivotal position of the pivotal member on the stationary member to pivotally position the seat back with respect to the seat cushion, the locking mechanism including a toothed locking ring on the pivotal member, a pair of toothed pawls mounted on the stationary member for radial movement with respect to the pivotal axis at diametrically opposite locations between locking positions where the pawls are engaged with the toothed locking ring to prevent pivotal movement of the seat back with respect to the seat cushion and unlocked positions where the pawls are unlocked from the locking ring to permit pivotal movement of the seat back with respect to the seat cushion, a pair of separate cams respectively associated with the pair of pawls and moveable with respect to each other and with respect to the pawls on opposite sides of the pivotal axis to respectively slidingly engage the pair of pawls, and a control that biases the pair of cams to move the pair of pawls to the locking positions and that is releasable so the cams permit movement of the pawls to the unlocked positions; and the pair of pawls each having a curved actuating surface, each of the pair of cams having a curved actuating surface that slidably engages the curved actuating surface of the associated pawl, the control including a control lever that pivots about the pivotal axis and has a pair of connections to the pair of cams to move the cams in curved paths, a spring that pivotally biases the control lever to bias the pair of cams to move the pair of pawls toward the locking positions as the curved actuating surfaces of the pawls and cams slidingly engage each other, and the control lever being movable against the spring bias thereof to move the pair of cams to permit the movement of the pair of pawls to the unlocked positions.

13. A vehicle seat back recliner comprising:

a stationary member for mounting on a vehicle seat cushion of a vehicle seat with which the recliner is to be used;

a pivotal member that is mounted for pivotal movement about a pivotal axis on the stationary member and that is adapted to mount a seat back of the vehicle seat; and a locking mechanism for selectively permitting pivotal adjustment and locking of the pivotal position of the pivotal member on the stationary member to pivotally position the seat back with respect to the seat cushion, the locking mechanism including a toothed locking ring on the pivotal member, a pair of toothed pawls mounted on the stationary member for radial movement with respect to the pivotal axis at diametrically opposite locations between locking positions where the pawls are engaged with the toothed locking ring to prevent pivotal movement of the seat back with respect to the seat cushion and unlocked positions where the pawls are unlocked from the locking ring to permit pivotal movement of the seat back with respect to the seat cushion, a pair of separate cams respectively associated with the pair of pawls and moveable with respect to each other and with respect to the pawls on opposite sides of the pivotal axis to respectively slidingly engage the pair of pawls, and a control that biases the pair of cams to move the pair of pawls to the locking positions and that is releasable so the cams permit movement of the pawls to the unlocked positions; and a pair of springs that respectively bias the pair of pawls radially toward the pivotal axis, the pair of pawls each having a curved actuating surface, each of the pair of cams having a curved actuating surface that slidingly engages the curved actuating surface of the associated pawl, the control including a control lever that pivots about the pivotal axis and has a pair of connections to the pair of cams to move the cams in curved paths, a spring that pivotally biases the control lever to bias the pair of cams to move the pair of pawls toward the locking positions as the curved actuating surfaces of the pawls and cams slidably engage each other, and the control lever being movable against the spring bias thereof to move the pair of cams to permit the movement of the pair of pawls to the unlocked positions.

14. A vehicle seat back recliner comprising:

a stationary member for mounting on a vehicle seat cushion of a vehicle seat with which the recliner is to be used;

a pivotal member that is mounted for pivotal movement about a pivotal axis on the stationary member and that is adapted to mount a seat back of the vehicle seat; and a locking mechanism for selectively permitting pivotal adjustment and locking of the pivotal position of the pivotal member on the stationary member to pivotally position the seat back with respect to the seat cushion, the locking mechanism including a toothed locking ring on the pivotal member, a pair of toothed pawls mounted on the stationary member for radial movement with respect to the pivotal axis at diametrically opposite locations between locking positions where the pawls are engaged with the toothed locking ring to prevent pivotal movement of the seat back with respect to the seat cushion and unlocked positions where the pawls are unlocked from the locking ring to permit pivotal movement of the seat back with respect to the seat cushion, a pair of springs that respectively bias the pair of pawls radially toward the pivotal axis to the unlocked positions, the pair of pawls each having a flat actuating surface that extends in an inclined relationship with a diameter extending between the pair of pawls through the pivotal axis, a pair of separate cams respectively associated with the pair of pawls and moveable on opposite sides of the pivotal axis to respectively engage the pair of pawls, each of the pair of cams having a flat actuating surface that extends in an inclined relationship to the diameter extending between the pair of pawls and in respective sliding engagement with the flat actuating surface of the associated pawl, a control include a control lever that pivots about the pivotal axis and has a pair of connections to the pair of cams to provide rectilinear movement thereof perpendicular to the diameter between the pawls, a spring that pivotally biases the control lever to bias the pair of cams to move the pair of pawls toward the locking positions as the flat actuating surfaces of the pawls and cams slidably engage each other, and the control lever being movable against the spring bias thereof to move the pair of cams to permit the movement of the pair of pawls under the spring bias thereof to the unlocked positions.

15. A vehicle seat back recliner comprising:

a stationary member for mounting on a vehicle seat cushion of a vehicle seat with which the recliner is to be used;

a pivotal member that is mounted for pivotal movement about a pivotal axis on the stationary member and that is adapted to mount a seat back of the vehicle seat; and a locking mechanism for selectively permitting pivotal adjustment and locking of the pivotal position of the pivotal member on the stationary member to pivotally position the seat back with respect to the seat cushion, the locking mechanism including a toothed locking ring on the pivotal member, a pair of toothed pawls mounted on the stationary member for radial movement with respect to the pivotal axis at diametrically opposite locations between locking positions where the pawls are engaged with the toothed locking ring to prevent pivotal movement of the seat back with respect to the seat cushion and unlocked positions where the pawls are unlocked from the locking ring to permit pivotal movement of the seat back with respect to the seat cushion, a pair of springs that respectively bias the pair of pawls radially toward the pivotal axis to the unlocked positions, each of the pair of pawls having a curved actuating surface, a pair of separate cams respectively associated with the pair of pawls and moveable on opposite sides of the pivotal axis, each of the pair of cams having a curved actuating surface that slidably engages the curved actuating surface of the associated pawl, a control include a control lever that pivots about the pivotal axis and has a pair of connections to the pair of cams to move the cams in curved paths, a spring that pivotally biases the control lever to bias the pair of cams to move the pair of pawls toward the locking positions, and the control lever being movable against the spring bias thereof to move the pair of cams to permit the movement of the pair of pawls under the spring bias thereof to the unlocked positions.

* * * * *